US008932126B2

(12) United States Patent
Nguyen

(10) Patent No.: US 8,932,126 B2
(45) Date of Patent: Jan. 13, 2015

(54) METHOD OF GAMING, A GAME CONTROLLER AND A GAMING SYSTEM

(75) Inventor: Hung Ngoc Nguyen, Sefton (AU)

(73) Assignee: Aristocrat Technologies Australia Pty Limited (AU)

( * ) Notice: Subject to any disclaimer, the term of this patent is extended or adjusted under 35 U.S.C. 154(b) by 548 days.

(21) Appl. No.: 12/340,714

(22) Filed: Dec. 20, 2008

(65) Prior Publication Data

US 2009/0233686 A1 Sep. 17, 2009

(30) Foreign Application Priority Data

Dec. 20, 2007 (AU) ................................ 2007907030

(51) Int. Cl.
*A63F 13/00* (2014.01)
*A63F 9/24* (2006.01)

(52) U.S. Cl.
CPC ...................................... *G06F 17/34* (2013.01)
USPC ............................................................ 463/20

(58) Field of Classification Search
USPC .......... 463/16, 22, 20; 273/138.1, 138.2, 139; 276/138.1, 138.2, 139
See application file for complete search history.

(56) References Cited

U.S. PATENT DOCUMENTS 5,951,396 A 9/1999 Tawil
6,165,070 A 12/2000 Nolte et al.
6,641,477 B1 * 11/2003 Dietz, II .......................... 463/20
7,066,811 B1 6/2006 Defrees-Parrott et al.
7,553,230 B2 * 6/2009 Cannon ........................... 463/18
8,075,392 B2 * 12/2011 Richardson ...................... 463/20
2002/0072407 A1 6/2002 Soltys et al.
2002/0169016 A1 * 11/2002 Tarantino ........................ 463/16
2004/0082376 A1 4/2004 Baerlocher et al.
2004/0266520 A1 * 12/2004 Aida ............................... 463/20
2005/0054420 A1 * 3/2005 Cregan et al. ................... 463/20
2005/0054436 A1 * 3/2005 Frizzell et al. .................. 463/25
2005/0059471 A1 3/2005 Cannon
2005/0187002 A1 * 8/2005 Falciglia ......................... 463/13
2005/0208994 A1 * 9/2005 Berman .......................... 463/20
2005/0227753 A1 10/2005 Luciano
2006/0135242 A1 6/2006 Tarantino
2006/0178196 A1 * 8/2006 Thomas .......................... 463/18
2006/0205473 A1 * 9/2006 Gomez et al. ................... 463/16
2007/0059670 A1 3/2007 Yates
2007/0060236 A1 * 3/2007 Dodge ............................ 463/11
2007/0060287 A1 3/2007 Reddicks et al.
2007/0167215 A1 7/2007 Majima et al.
2008/0045320 A1 * 2/2008 Kato ............................... 463/20
2008/0045325 A1 * 2/2008 Kato ............................... 463/21

(Continued)

FOREIGN PATENT DOCUMENTS

AU 2007203349 2/2008
CA 2533855 10/2000

(Continued)

*Primary Examiner* — Michele Fan
(74) *Attorney, Agent, or Firm* — McAndrews, Held & Malloy, Ltd.

(57) ABSTRACT

A method of gaming comprising: selecting a plurality of symbols and displaying the symbols at a plurality of display positions on a display; determining whether there is a match between a first subset of symbols at a first subset of the display positions and a second subset of symbols at a second subset of the display positions based on at least one matching rule, the first and second subsets of display positions having the same number of display positions; and taking at least one designated action if a match is determined.

61 Claims, 10 Drawing Sheets

(56) References Cited

U.S. PATENT DOCUMENTS

| | | | | |
|---|---|---|---|---|
| 2008/0058062 | A1 * | 3/2008 | Okada | 463/20 |
| 2008/0064483 | A1 * | 3/2008 | Sakuma | 463/20 |
| 2008/0064487 | A1 * | 3/2008 | Stevens et al. | 463/25 |
| 2008/0113735 | A1 * | 5/2008 | Maya | 463/20 |
| 2008/0182645 | A1 * | 7/2008 | Okada | 463/20 |

FOREIGN PATENT DOCUMENTS

| | | |
|---|---|---|
| CA | 2528267 | 5/2007 |
| GB | 2405736 | 3/2005 |
| GB | 2416902 | 2/2006 |
| GB | 2419999 | 5/2006 |
| JP | 2003024568 | 1/2003 |
| JP | 2003093620 | 4/2003 |
| JP | 2004033322 | 2/2004 |
| JP | 2005176921 | 7/2005 |
| JP | 2005177347 | 7/2005 |
| JP | 2006055319 | 3/2006 |
| KR | 20020011851 | 2/2002 |
| MX | PA06002899 | 6/2006 |
| MX | PA06002906 | 6/2006 |
| NZ | 525629 | 2/2005 |
| NZ | 525185 | 2/2006 |
| RU | 2183358 | 6/2002 |
| WO | WO9633782 | 10/1996 |
| WO | WO0069535 | 11/2000 |
| WO | WO0189639 | 11/2001 |
| WO | WO2007073528 | 6/2007 |

* cited by examiner

METHOD OF GAMING, A GAME CONTROLLER AND A GAMING SYSTEM

RELATED APPLICATIONS

This application claims priority to Australian Provisional Patent Application No. 2007907030, having a filing date of Dec. 20, 2007, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a method of gaming, a game controller and a gaming system.

BACKGROUND OF THE INVENTION

Many gaming systems are provided in the form of gaming machines which implement a spinning reel or slot machine game. In such games, a number of reels are spun and stopped with a plurality of symbols displayed on a display. The rules of such games describe how the symbols may be combined to form winning combinations. For example, a winning combination may be four identical symbols arranged from left to right on a designated win line. While such gaming systems provide users with enjoyment, a need exists for alternative gaming systems in order to maintain or increase player enjoyment.

BRIEF SUMMARY OF THE INVENTION

In a first aspect, the invention provides a method of gaming comprising:

selecting a plurality of symbols and displaying the symbols at a plurality of display positions on a display;

determining whether there is a match between a first subset of symbols at a first subset of the display positions and a second subset of symbols at a second subset of the display positions based on at least one matching rule, the first and second subsets of display positions having the same number of display positions; and taking at least one designated action if a match is determined.

In an embodiment, determining whether there is a match comprises determining whether the symbols of the second subset are in the same relationship to one another as the symbols of the first subset.

In an embodiment, each symbol of the first subset and second subsets is next to at least one other symbol of the subset to which it belongs.

In an embodiment, each subset comprises two to seven symbols.

In an embodiment, there are fifteen display positions.

In an embodiment, each symbol subset comprises four symbols arranged in a square.

In an embodiment, each symbol subset comprises five symbols arranged in a line of three and a line of two next to the line of three.

In an embodiment, each symbol subset comprises six symbols arranged in a rectangle.

In an embodiment, the display positions are arranged in a plurality of columns, and each symbol subset comprises symbols displayed in at least two different columns.

In an embodiment, the display positions of each symbol set are designated such that the symbol sets have designated positions of the display positions.

In an embodiment, the display positions of a symbol set are varied in order to attempt to locate a match.

In an embodiment, a matching rule is that the first and second subsets include the same symbols.

In an embodiment, a further matching rule is that the symbols of each of the first and second symbol subsets are in the same relationship to one another.

In an embodiment, a further matching rule is that the symbols of each of the first and second symbol subsets would be in the same relationship to one another if a transformation were applied to one of the subsets.

In an embodiment, the transformation is selected from the group comprising: a rotation of symbols within a symbol set; a rotation of a symbol set; and a mirror reflection of a symbol set.

In an embodiment, the designated action is making an award.

In an embodiment, the designated action is to make a modification to the displayed symbols.

In an embodiment, the modification is made by rotating one or both of the matched symbol sets and determining whether to make an award based on the displayed symbols after rotation.

In an embodiment, the modification is made by modifying each symbol within the matched symbol sets.

In an embodiment, the modification is made by modifying each symbol not in the matched symbol sets.

In an embodiment, the symbols are modified by being changed into one symbol.

In an embodiment, the method comprises evaluating the symbols at the display positions after the modification based on a player win entitlement to determine whether to make an award.

In a second aspect, the invention provides a game controller for a gaming system, the game controller arranged to:

select a plurality of symbols and cause a display to display the symbols at a plurality of display positions;

determine whether there is a match between a first subset of symbols at a first subset of the display positions and a second subset of symbols at a second subset of the display positions based on at least one matching rule, the first and second subsets of display positions having the same number of display positions; and take at least one designated action if a match is determined.

In an embodiment, the game controller comprises a symbol selector for selecting the symbols.

In an embodiment, the game controller comprises a match evaluator for determining whether there is a match.

In an embodiment, the action is to make an award and the game controller comprises an award maker for making the award.

In an embodiment, the game controller is arranged to determine whether there is a match by determining whether the symbols of the second subset are in the same relationship to one another as the symbols of the first subset.

In an embodiment, each symbol of the first subset and second subsets is next to at least one other symbol of the subset to which it belongs.

In an embodiment, each subset comprises two to seven symbols.

In an embodiment, there are fifteen display positions.

In an embodiment, each symbol subset comprises four symbols arranged in a square.

In an embodiment, each symbol subset comprises five symbols arranged in a line of three and a line of two next to the line of three.

In an embodiment, each symbol subset comprises six symbols arranged in a rectangle.

In an embodiment, the display positions are arranged in a plurality of columns, and each symbol subset comprises symbols displayed in at least two different columns.

In an embodiment, the display positions of each symbol set are designated such that the symbol sets have designated positions of the display positions.

In an embodiment, the display positions of a symbol set are varied in order to attempt to locate a match.

In an embodiment, a matching rule is that the first and second subsets include the same symbols.

In an embodiment, a further matching rule is that the symbols of each of the first and second symbol subsets are in the same relationship to one another.

In an embodiment, a further matching rule is that the symbols of each of the first and second symbol subsets would be in the same relationship to one another if a transformation were applied to one of the subsets.

In an embodiment, the transformation is selected from the group comprising: a rotation of symbols within a symbol set; a rotation of a symbol set; and a mirror reflection of a symbol set.

In an embodiment, the action is to make a modification and the game controller comprises a modifier for making the modification In an embodiment, the modification is made by rotating one or both of the matched symbol sets and determining whether to make an award based on the displayed symbols after rotation.

In an embodiment, the modification is made by modifying each symbol within the matched symbol sets.

In an embodiment, the modification is made by modifying each symbol not in the matched symbol sets.

In an embodiment, the symbols are modified by being changed into one symbol.

In an embodiment, the game controller is arranged to evaluate the symbols at the display positions after the modification based on a player win entitlement to determine whether to make an award.

In an embodiment, the game controller is implemented by a processor arranged to execute program code stored in a memory.

In a third aspect, the invention provides a gaming system comprising:

a display; and a game controller arranged to:

select a plurality of symbols and display the symbols at a plurality of display positions on the display;

determine whether there is a match between a first subset of symbols at a first subset of the display positions and a second subset of symbols at a second subset of the display positions based on at least one matching rule, the first and second subsets of display positions having the same number of display positions; and take at least one designated action if a match is determined.

In an embodiment, the display forms part of a player interface further comprising a game play mechanism operable by the player to play a game including the above determination of a match.

In an embodiment, the game controller comprises a symbol selector for selecting the symbols.

In an embodiment, the game controller comprises a match evaluator for determining whether there is a match.

In an embodiment, the action is to make an award and the game controller comprises an award maker for making the award.

In an embodiment, the game controller is arranged to determine whether there is a match by determining whether the symbols of the second subset are in the same relationship to one another as the symbols of the first subset.

In an embodiment, each symbol of the first subset and second subsets is next to at least one other symbol of the subset to which it belongs.

In an embodiment, each subset comprises two to seven symbols.

In an embodiment, there are fifteen display positions.

In an embodiment, each symbol subset comprises four symbols arranged in a square.

In an embodiment, each symbol subset comprises five symbols arranged in a line of three and a line of two next to the line of three.

In an embodiment, each symbol subset comprises six symbols arranged in a rectangle.

In an embodiment, the display positions are arranged in a plurality of columns, and each symbol subset comprises symbols displayed in at least two different columns.

In an embodiment, the display positions of each symbol set are designated such that the symbol sets have designated positions of the display positions.

In an embodiment, the display positions of a symbol set are varied in order to attempt to locate a match.

In an embodiment, a matching rule is that the first and second subsets include the same symbols.

In an embodiment, a further matching rule is that the symbols of each of the first and second symbol subsets are in the same relationship to one another.

In an embodiment, a further matching rule is that the symbols of each of the first and second symbol subsets would be in the same relationship to one another if a transformation were applied to one of the subsets.

In an embodiment, the transformation is selected from the group comprising: a rotation of symbols within a symbol set; a rotation of a symbol set; and a mirror reflection of a symbol set.

In an embodiment, the action is to make a modification and the game controller comprises a modifier for making the modification In an embodiment, the modification is made by rotating one or both of the matched symbol sets and determining whether to make an award based on the displayed symbols after rotation.

In an embodiment, the modification is made by modifying each symbol within the matched symbol sets.

In an embodiment, the modification is made by modifying each symbol not in the matched symbol sets.

In an embodiment, the symbols are modified by being changed into one symbol.

In an embodiment, the game controller is arranged to evaluate the symbols at the display positions after the modification based on a player win entitlement to determine whether to make an award.

In an embodiment, the game controller comprises a processor arranged to execute program code stored in a memory to implement the game controller.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
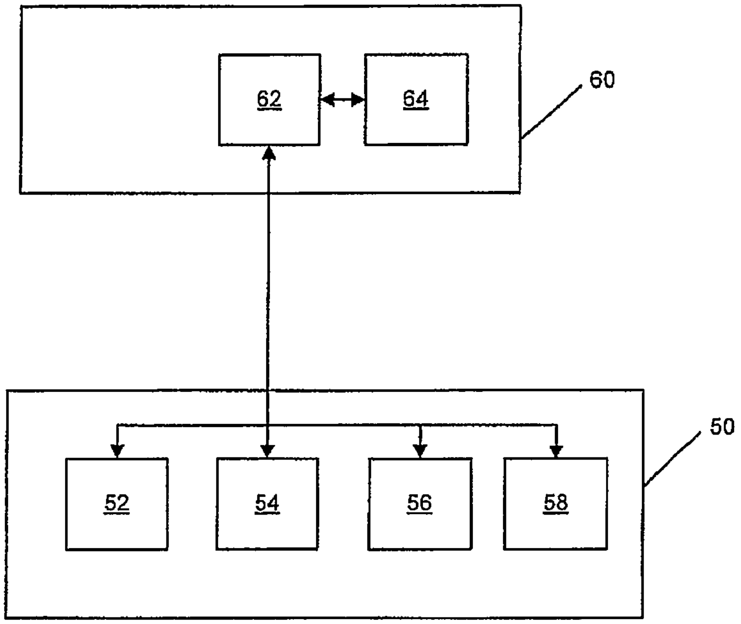
FIG. 1 is a block diagram of the core components of a gaming system.

Referring to the drawings, there is shown a gaming system having a game controller arranged to implement a game where subsets of symbols selected by the game controller for display on a display are compared to determine whether they match based on one or more matching rules. If there is a match, the game controller takes a designated action. The designated action may be to modify the displayed symbol or to make an award.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
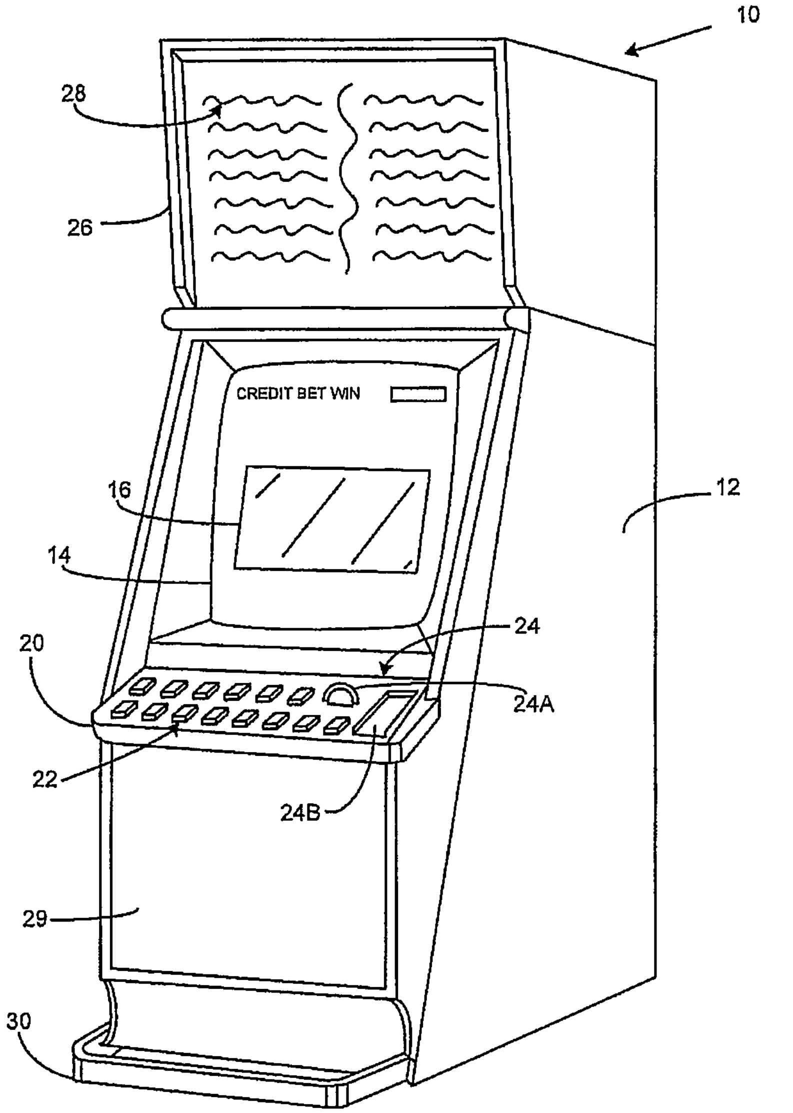
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
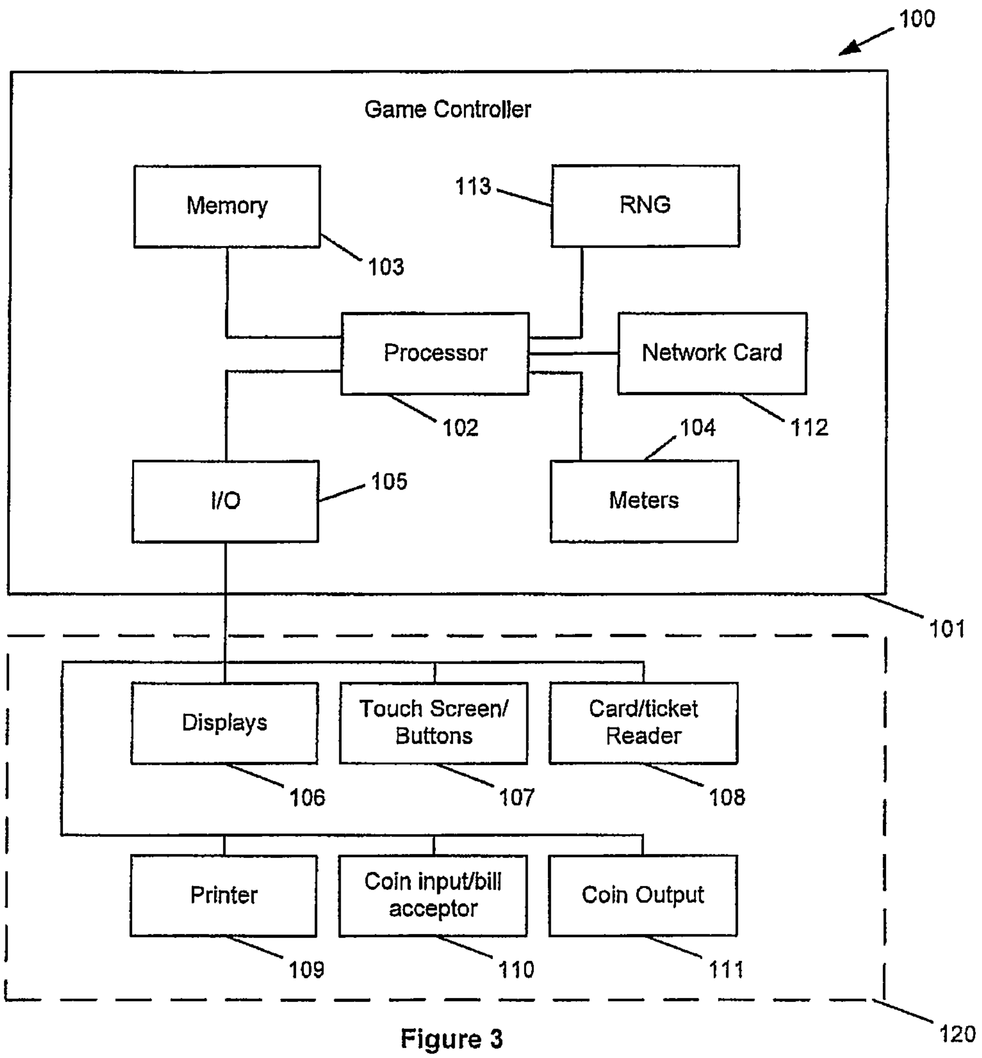
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
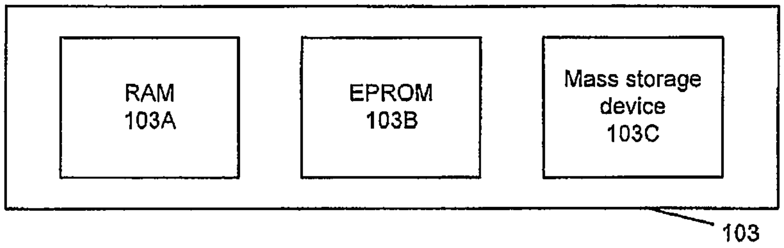
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
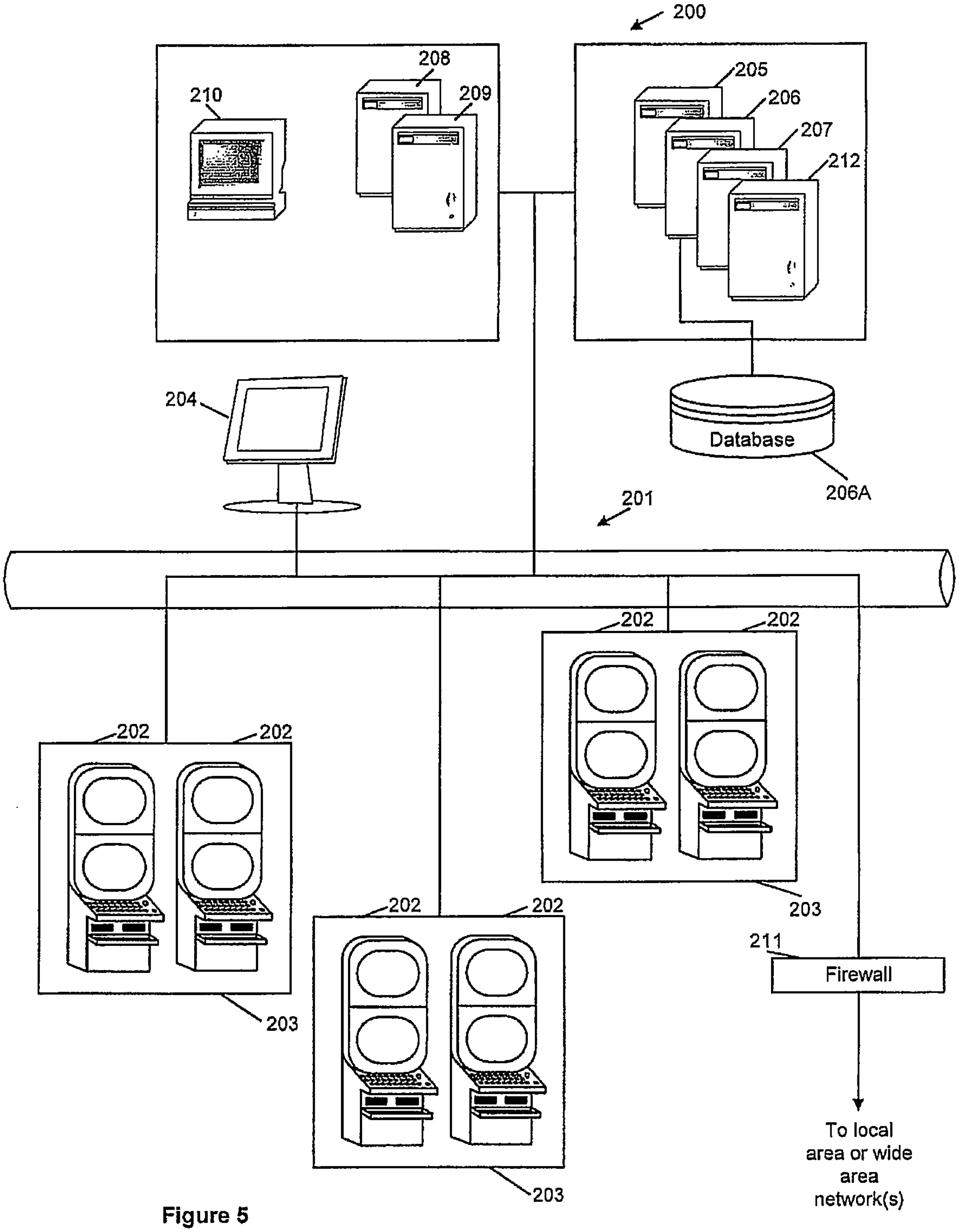
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Further Detail of Gaming System

Figure 6:
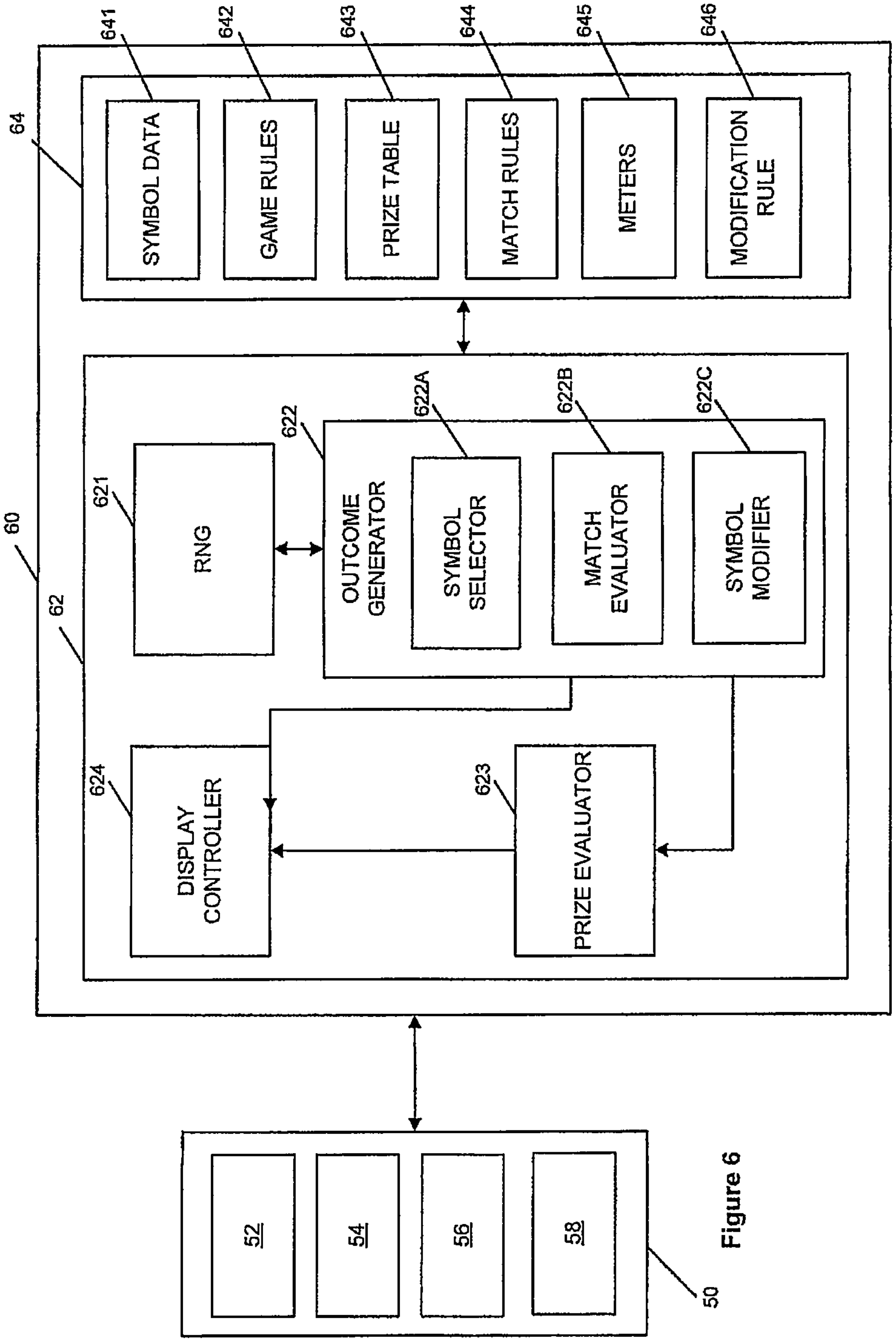
FIG. 6 is a further block diagram of a gaming system.

FIG. 6 illustrates an embodiment where the action that the gaming system takes in response to determining that there is a match between first and second sets of symbols is to modify the initially displayed symbols.

To play the game, the player obtains credits with credit mechanism and operates game play mechanism 56 to make a bet of an amount of credits and to indicate that they want to play a game. The game rules 642 allow the game controller to determine that the player's operation of mechanism 56 entitles the player to the symbol set matching feature.

The outcome generator 622 operates in response to the player's operation of game play mechanism 56 to generate a game outcome which will then be evaluated by prize evaluator 623. The first part of forming the game outcome is for a symbol selector 622A to select symbols from a set of symbols specified by symbol data 641 using the random number generator 621. The selected symbols are advised to the display controller 624 which causes them to be displayed on display 54 at a set of display positions.

One example of selecting symbols is for the symbol selector 622A to select symbols for display from a plurality of symbol sets corresponding to respective ones of a plurality of spinning reels. The symbol sets 641 can specify a sequence of symbols for each reel such that the symbol selector 622A can select a symbol by selecting a stopping position in the sequence. In one example, three symbols of each of five reels may be displayed such that symbols are displayed at fifteen display positions on display 54 under control of display controller 624 which may incorporate a relevant graphics driver. Persons skilled in the art will appreciate that other numbers of display positions may be employed, for example twenty display positions.

The match evaluator 622B then determines whether the selected symbols displayed on the display 54 meet the match rules 644 stored in memory. The match rules 644 specify the nature of symbol sets which are to be compared and what is required for a match. In the embodiment, the match rules 644 specify that two symbol sets of the same type are to be compared.

The nature of the symbol sets and the matching will vary from embodiment to embodiment and may vary depending on the implementation chosen by the game designer and/or the nature of the bet made by the player—i.e. in some embodiments the symbol sets and/or match rules applied may depend on the bet placed by the player with game play mechanism 56.

The nature of the symbol sets is specified by the number of symbols in each symbol set, the relative orientation of symbols within the set, whether the symbol set may take more than one orientation, and whether the symbol set may take any position relative to the display positions or whether the positions it can take are limited. There may be two to seven symbols in a set in an embodiment where fifteen symbol are selected for display by symbol selector. Four to six symbols are some suitable examples.

Relative orientation of the symbols may mean, for example, that a symbol set having four symbols may be arranged in a square or in a pair of overlapping but offset lines where each symbol is contiguous with one other symbol. This can also be understood as a pattern of symbols. Further examples, of orientation can be found in the examples set out below.

Where the relative orientation of symbols is not completely symmetrical, for example, in the case of five symbols, the rules 644 may specify whether the sets can take more than one orientation relative to the display positions.

The rules 644 may also specify whether the sets correspond to fixed ones of the display positions such that a match must be, in effect, between designated display positions or can be varied relative to the display positions such that a match may be provided by finding two matching sets of symbols anywhere within the display positions.

The match rules 644 can also specify different rules for determining whether a match exists. In one example, a matching rule may be that the same symbols are found within two sets of symbols of the same pattern. A further rule may require the symbols to be in the same relative orientation to one another within symbol sets. A further rule may be that a transformation such as a rotation or reflection of symbol can bring the symbols into the same relative orientation.

In this embodiment, match evaluator 622B determines whether first and second sets of symbols match based on the rules 644. If there is a match, symbol modifier 622C modifies the symbols based on modification rules 646 stored in memory 64 and the modification is displayed on display 54 under control of display controller 624. One example of a modification is to move the matching symbol sets, for example, by rotating them. Another example of modification is to change all of the matched symbols into the same symbol, for example a symbol having an additional play characteristic such as a wild symbol or a high value symbol. In another example, all symbols not in the matching symbol sets may be changed into the same symbol.

Prize evaluator 623 then determines whether to award any prizes from prize table 643 based on the modified symbols. In some embodiments, the prize evaluator may evaluate prizes both before an after the modification.

It will be appreciated that the above embodiment shows processor 62 implementing the random number generator 621, outcome generator 622, prize awarder 623 and display controller based on software routines stored in memory 64. It will be appreciated that one or more of the above modules may be implemented in other ways, for example, a dedicated circuit could implement random number generator 621.

Figure 7:
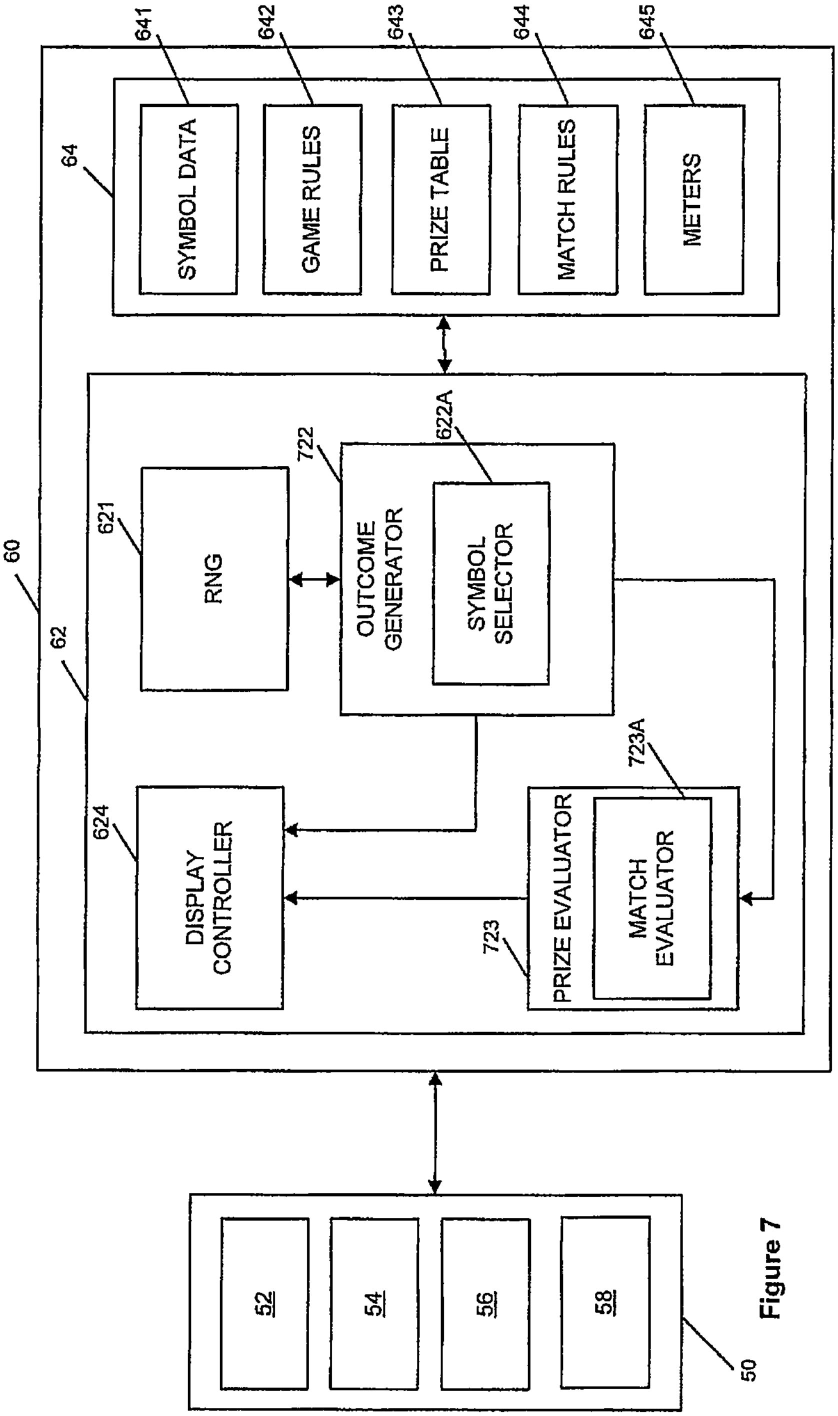
FIG. 7 is a block diagram of an alternative gaming system.

In the alternative embodiment of FIG. 7, like numbers are used where elements perform the same functions as in FIG. 6. In this embodiment symbols are selected by symbol selector 622A of outcome generator 722 in the same manner as described above. However, rather than determining whether to modify the symbols, the match evaluator 723A is arranged to determine whether to award match awards as part of evaluation by the prize evaluator 723. In other respects, the symbol sets and matching rules may take the same form.

Persons skilled in the art will appreciate that not just prizes such as credits may be awarded by the match evaluator in such an embodiment. For example, a match may result in the award of a series of free games, trigger a feature game, a jackpot game or a hyperlink game as well as other prizes known in the art.

Persons skilled in the art will also appreciate that the above game, may itself be a feature game triggered from a base game or available only if certain conditions are met such as a prescribed turnover or bet amount.

Figure 8:
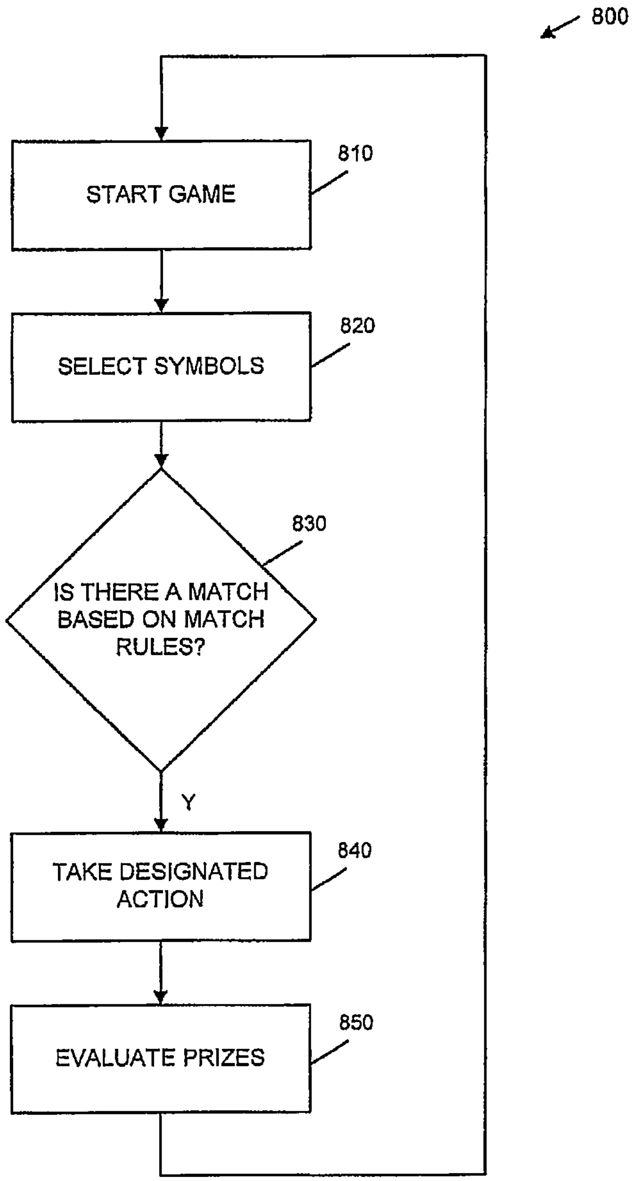
FIG. 8 is a flow chart of an embodiment.

The method 800 implemented by the gaming system is shown in FIG. 8. After a game starts 810, symbols are selected 820 and displayed. It is then determined 830 whether to take an action such as modifying the symbols. Prizes are then evaluated 840 (noting that at step 830 prizes may be evaluated for matching symbol sets).

Persons skilled in the art will appreciate that the above method can be a way of providing additional opportunity's for a player of a game and hence can provide an additional win entitlement to a player's normal entitlement to win in a game. For example, wins by matching sets of symbols may be available for an ante bet. A player's normal win entitlement will vary from game to game and may or may not be dependent on player selections. In most spinning reel games, it is typical for the player's entitlement to be affected by the amount they wager and selections they make (i.e. the nature of the wager). For example, a player's win entitlement may be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In many games, the player's win entitlement is not strictly limited to the lines they have selected, for example, "scatter"

pays are awarded independently of a player's selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums. The win entitlement is not always purchased—e.g. a series of free games may be awarded.

EXAMPLES

Further variations on the above embodiment will be apparent from the following examples. Referring to FIGS. 9A to 9F there is shown in each of the figures a set of 15 display positions 910 which can be formed, for example, by 5 spinning reels with 3 symbols displayed for each reel.

Figure 9A:
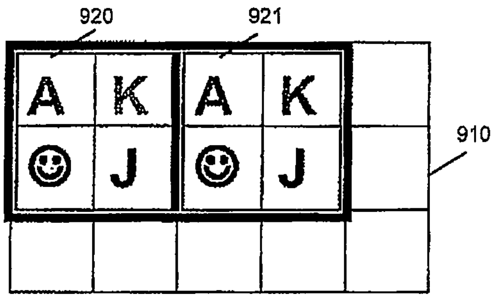
FIGS. 9A to 9F are exemplary screen displays.
Figure 9B:
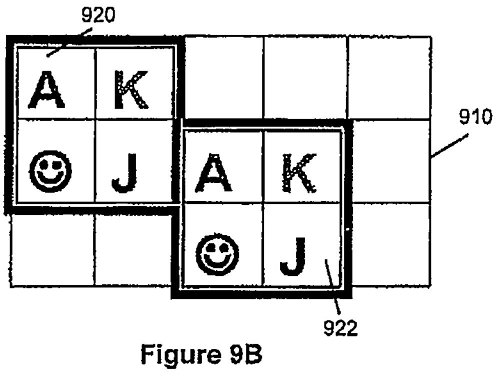
Figure 9C:
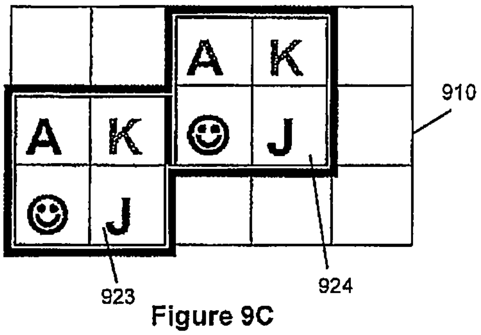
Figure 9D:
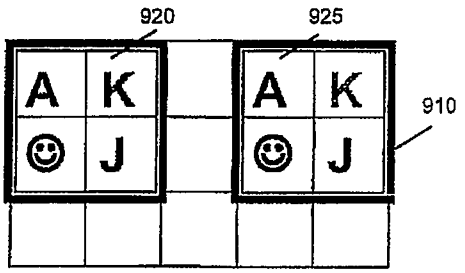
Figure 9E:
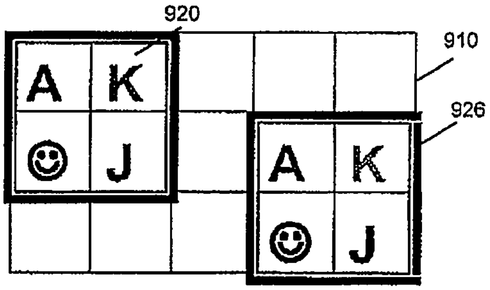
Figure 9F:
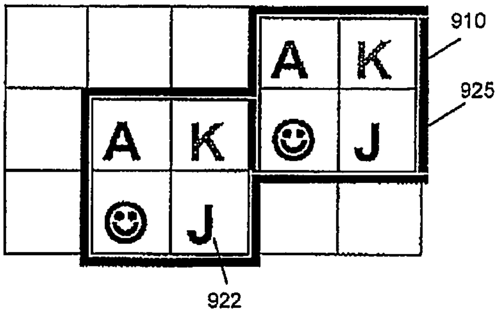

FIGS. 9A to 9F each show an example of matching square symbol sets having four symbols. Each of FIGS. 9A to 9F illustrate examples where a match can occur if a set of four symbols are in the same relative orientation displaced from one another at two different locations within the display positions 910. In FIG. 9A, a first set of symbols 920 is next to an identical. set of second set of symbols 921. In FIG. 9B a first set of symbols 920 is next to a second set of symbols 922 displaced downwardly relative to the first set 920. In FIG. 9C a first set of symbols 923 is next to a second set of symbols 924 in the upper two rows of the display positions 910. In FIG. 9D a first set of symbols 920 and a second set of symbols 925 are displaced laterally of one another. In FIG. 9E the symbols are displaced laterally and downwardly 920, 926 of the two symbol sets. In FIG. 9F both symbols sets 922, 925 are towards the right hand side of the set of display positions.

Figure 10A:
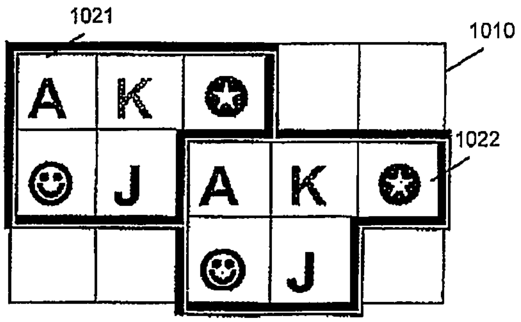
FIGS. 10A to 10D are further exemplary screen displays.

FIGS. 10A to 10D show other examples where there are 15 display positions 1010. FIG. 10A shows an example where there are five display positions in each set of symbols 1021, 1022. In this example the matching rule is that each of the symbols be the same and in the same relative orientation to one another as can be perceived from this example.

Figure 10B:
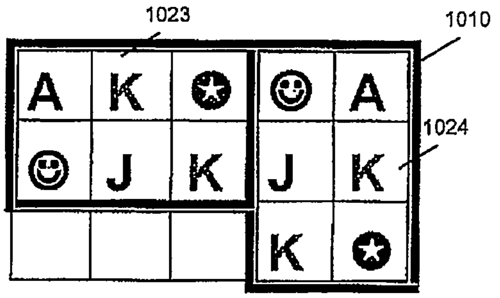

FIG. 10B shows an alternative example where there are six symbols in each symbol set 1023, 1024 and a match is allowed if when the entire symbol set 1024 is rotated, the symbols are in the same orientation as symbol set 1023.

Figure 10C:
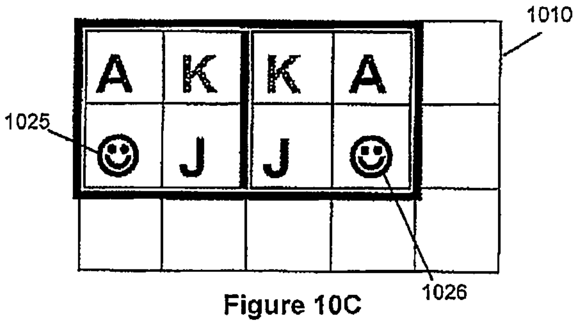

FIG. 10C shows an example where first and second symbol sets 1025, 1026 contain the same symbols in mirror reflection to one another.

Figure 10D:
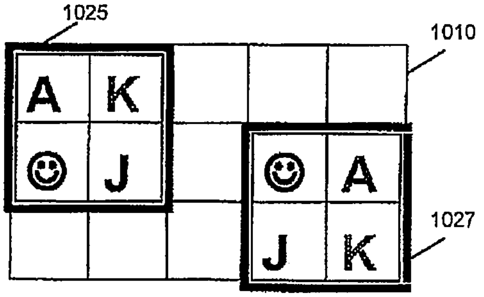

FIG. 10D shows a further example where the symbols are the same but the symbols in symbol set 1027 are rotated within the set relative to the symbols of the first symbol set 1025.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming comprising:

selecting a plurality of symbols and displaying the symbols at a plurality of display positions on a display;

determining a nature of a first subset and a second subset of display positions from the plurality of display positions, including specifying (1) a number of symbols in said first subset and in said second subset, and (2) a relative orientation of symbols displayed within said first subset and said second subset;

comparing a plurality of first symbols displayed in said first subset of the display positions to a plurality of second symbols displayed in said second subset of the display positions, wherein the first and second subsets of display positions have the same number of display positions, said comparing comprising determining (1) whether each of the plurality of first symbols is identical to each of the plurality of second symbols, and (2) whether the plurality of first symbols is displayed in a relative orientation that is the same as the displayed relative orientation of the plurality of second symbols; and taking at least one designated action if it is determined that each of the plurality of first symbols is identical to each of the plurality of second symbols and that the plurality of first symbols is displayed in a relative orientation that is the same as the displayed relative orientation of the plurality of second symbols.

2. A method as claimed in claim 1, wherein each symbol of the first and second subsets is next to at least one other symbol of the subset to which it belongs.

3. A method as claimed in claim 1, wherein each first and second subset comprises two to seven symbols.

4. A method as claimed in claim 1, wherein said plurality of display positions are fifteen display positions.

5. A method as claimed in claim 1, wherein each symbol subset comprises four symbols arranged in a square.

6. A method as claimed in claim 1, wherein each symbol subset comprises five symbols arranged in a line of three and a line of two next to the line of three.

7. A method as claimed in claim 1, wherein each symbol subset comprises six symbols arranged in a rectangle.

8. A method as claimed in claim 1, wherein the display positions are arranged in a plurality of columns, and each symbol subset comprises symbols displayed in at least two different columns.

9. A method as claimed in claim 1, wherein the display positions of the first symbol subset and the second symbol subset are designated such that the first and second symbol subsets have designated positions of the display positions.

10. A method as claimed in claim 1, and further comprising varying the display positions of said first subset.

11. A method as claimed in claim 1, wherein determining includes determining that the symbols of each of the first and second symbol subsets would be identical and displayed in the same relative orientation if a predetermined transformation were applied to one of the symbol subsets.

12. A method as claimed in claim 11, and further comprising selecting the predetermined transformation from the group comprising: a rotation of symbols within a symbol subset; a rotation of a symbol subset; and a mirror reflection of a symbol subset.

13. A method as claimed in claim 1, wherein taking at least one designated action includes making an award.

14. A method as claimed in claim 1, and further comprising taking a second designated action if it is determined that (1) each of the plurality of first symbols is not identical to each of the plurality of second symbols, or (2) each of the plurality of first symbols is displayed in different relative orientation to each of the plurality of second symbols; and wherein taking a second designated action includes making a modification to the displayed symbols.

15. A method as claimed in claim 14, wherein making a modification includes rotating one or both of the symbol subsets and determining whether to make an award based on the displayed symbols after rotation.

16. A method as claimed in claim 15, wherein making a modification includes changing the symbols into one symbol.

17. A method as claimed in claim 14, wherein making a modification includes modifying each symbol within the symbol subsets.

18. A method as claimed in claim 14, wherein taking at least one designated action includes evaluating the symbols at the display positions based on a player win entitlement after said making a modification and determining whether to make an award.

19. A game controller for a gaming system, the game controller configured to:

select a plurality of symbols and cause a display to display the symbols at a plurality of display positions;

determine a nature of a first subset and a second subset of display positions from the plurality of display positions, including specifying (1) a number of symbols in said first subset and in said second subset, and (2) a relative orientation of symbols displayed within said first subset and said second subset;

compare a plurality of first symbols displayed in said first subset of the display positions to a plurality of second symbols displayed in said second subset of the display positions to determine (1) whether each of the plurality of first symbols is identical to each of the plurality of second symbols, wherein the first and second subsets of display positions have the same number of display positions, and (2) whether the plurality of first symbols is displayed in a relative orientation that is the same as the displayed relative orientation of the plurality of second symbols; and take at least one designated action if it is determined that (1) each of the plurality of first symbols is identical to each of the plurality of second symbols, and (2) the plurality of first symbols is displayed in a relative orientation that is the same as the displayed relative orientation of the plurality of second symbols.

20. A game controller as claimed in claim 19 comprising a symbol selector for selecting the symbols.

21. A game controller as claimed in claim 19 comprising a match evaluator for determining whether there is a match.

22. A game controller as claimed in claim 19, wherein the at least one designated action is to make an award and the game controller comprises an award maker for making the award.

23. A game controller as claimed in claim 19, wherein each symbol of the first subset and second subsets is next to at least one other symbol of the subset to which it belongs.

24. A game controller as claimed in claim 19, wherein each subset comprises two to seven symbols.

25. A game controller as claimed in claim 19, wherein there are fifteen display positions.

26. A game controller as claimed in claim 19, wherein each symbol subset comprises four symbols arranged in a square.

27. A game controller as claimed in claim 19, wherein each symbol subset comprises five symbols arranged in a line of three and a line of two next to the line of three.

28. A game controller as claimed in claim 19, wherein each symbol subset comprises six symbols arranged in a rectangle.

29. A game controller as claimed in claim 19, wherein the display positions are arranged in a plurality of columns, and each symbol subset comprises symbols displayed in at least two different columns.

30. A game controller as claimed in claim 19, wherein the display positions of the first symbol subset and the second symbol subset are designated such that the first and second symbol subsets have designated positions of the display positions.

31. A game controller as claimed in claim 19, wherein the display positions of the first subset are varied.

32. A game controller as claimed in claim 19, wherein the game control is further configured to determine that the symbols of each of the first and second symbol subsets would be identical and displayed in the same relative orientation if a predetermined transformation were applied to one of the symbol subsets.

33. A game controller as claimed in claim 32, wherein the predetermined transformation is selected from the group comprising: a rotation of symbols within a symbol subset; a rotation of a symbol subset; and a mirror reflection of a symbol subset.

34. A game controller as claimed in claim 19, and wherein the game controller is further configured to take a second designated action if it is determined that (1) each of the plurality of first symbols is not identical to each of the plurality of second symbols, or (2) each of the plurality of first symbols is displayed in different relative orientation to each of the plurality of second symbols; and wherein the second designated action is to make a modification and the game controller comprises a modifier for making the modification.

35. A game controller as claimed in claim 34, wherein the modification includes rotating one or both of the symbol subsets and determining whether to make an award based on the displayed symbols after rotation.

36. A game controller as claimed in claim 34, wherein the modification includes modifying each symbol within the symbol subsets.

37. A game controller as claimed in claim 36, wherein the modification includes changing the symbols into one symbol.

38. A game controller as claimed in claim 34, and wherein the game controller is further configured to evaluate the symbols at the display positions based on a player win entitlement after said making a modification to determine whether to make an award.

39. A game controller as claimed in claim 19 implemented by a processor configured to execute program code stored in a memory.

40. A gaming system comprising:

a display; and a game controller configured to:

select a plurality of symbols and display the symbols at a plurality of display positions on the display;

determine a nature of a first subset and a second subset of display positions from the plurality of display positions, including specifying (1) a number of symbols in said first subset and in said second subset, and (2) a relative orientation of symbols displayed within said first subset and said second subset;

compare a plurality of first symbols displayed in said first subset of the display positions to a plurality of second symbols displayed in said second subset of the display positions to determine (1) whether each of the plurality of first symbols is identical to each of the plurality of second symbols, wherein the first and second subsets of display positions have the same number of display positions, and (2) whether the plurality of first symbols is displayed in a relative orientation that is the same as the displayed relative orientation of the plurality of second symbols; and take at least one designated action if it is determined that (1) each of the plurality of first symbols is identical to each of the plurality of second symbols, and (2) the plurality of first symbols is displayed in a relative orientation that is the same as the displayed relative orientation of the plurality of second symbols.

41. A gaming system as claimed in claim 40, wherein the display forms part of a player interface, said player interface further comprising a game play mechanism operable by the player to play a game.

42. A gaming system as claimed in claim 40, wherein the game controller comprises a symbol selector for selecting the symbols.

43. A gaming system as claimed in claim 40, wherein the game controller comprises a match evaluator for determining whether a match criterion has been met.

44. A gaming system as claimed in claim 40, wherein the action is to make an award and the game controller comprises an award maker for making the award.

45. A gaming system as claimed in claim 40, wherein each symbol of the first subset and second subsets is next to at least one other symbol of the subset to which it belongs.

46. A gaming system as claimed in claim 40, wherein each subset comprises two to seven symbols.

47. A gaming system as claimed in claim 40, wherein there are fifteen display positions.

48. A gaming system as claimed in claim 40, wherein each symbol subset comprises four symbols arranged in a square.

49. A gaming system as claimed in claim 40, wherein each symbol subset comprises five symbols arranged in a line of three and a line of two next to the line of three.

50. A gaming system claimed in claim 40, wherein each symbol subset comprises six symbols arranged in a rectangle.

51. A gaming system as claimed in claim 40, wherein the display positions are arranged in a plurality of columns, and each symbol subset comprises symbols displayed in at least two different columns.

52. A gaming system as claimed in claim 40, wherein the display positions of the first symbol subset and the second symbol subset are designated such that the first and second symbol subsets have designated positions of the display positions.

53. A gaming system as claimed in claim 40, wherein the display positions of the first subset are varied.

54. A gaming system as claimed in claim 40, wherein the gaming controller is further configured to determine that the symbols of each of the first and second symbol subsets would be identical and displayed in the same relative orientation if a predetermined transformation were applied to one of the symbol subsets.

55. A gaming system as claimed in claim 54, wherein the predetermined transformation is selected from the group comprising: a rotation of symbols within the first subset; a rotation of the first subset; and a mirror reflection of the first subset.

56. A gaming system as claimed in claim 40, wherein the action is to make a modification and the game controller comprises a modifier for making the modification.

57. A gaming system as claimed in claim 56, and wherein the game controller is further configured to take a second designated action if it is determined that (1) each of the plurality of first symbols is not identical to each of the plurality of second symbols, or (2) each of the plurality of first symbols is displayed in different relative orientation to each of the plurality of second symbols; and wherein the second designated action is to make the modification by rotating one or both of the symbol subsets and determining whether to make an award based on the displayed symbols after rotation.

58. A gaming system as claimed in claim 57, wherein the modification includes modifying each symbol within the symbol subsets.

59. A gaming system as claimed in claim 58, wherein the modification includes changing the symbols into one symbol.

60. A gaming system as claimed in claim 56, wherein the game controller is configured to evaluate the symbols at the display positions based on a player win entitlement after said making a modification to determine whether to make an award.

61. A gaming system as claimed in claim 56 comprising a processor arranged to execute program code stored in a memory to implement the game controller.

* * * * *